US010958515B2

United States Patent
Chen et al.

(10) Patent No.: US 10,958,515 B2
(45) Date of Patent: *Mar. 23, 2021

(54) ASSESSMENT AND DYNAMIC PROVISIONING OF COMPUTING RESOURCES FOR MULTI-TIERED APPLICATION

(71) Applicant: INTERNATIONAL BUSINESS MACHINES CORPORATION, Armonk, NY (US)

(72) Inventors: Danny Y. Chen, Austin, TX (US); David A. Cox, Sugar Grove, IL (US); Brent R. Phillips, Austin, TX (US); John H. Smith, McKinney, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/526,481

(22) Filed: Jul. 30, 2019

(65) Prior Publication Data
US 2019/0356543 A1 Nov. 21, 2019

Related U.S. Application Data

(63) Continuation of application No. 14/949,923, filed on Nov. 24, 2015, now Pat. No. 10,439,870.

(51) Int. Cl.
*G06F 15/173* (2006.01)
*H04L 12/24* (2006.01)
(Continued)

(52) U.S. Cl.
CPC ............ *H04L 41/0806* (2013.01); *G06F 9/46* (2013.01); *G06F 9/5011* (2013.01); *H04L 41/12* (2013.01)

(58) Field of Classification Search
None
See application file for complete search history.

(56) References Cited

U.S. PATENT DOCUMENTS 8,332,824 B2  12/2012  Shemenzon et al.
8,756,307 B1   6/2014  Chen et al.
(Continued)

OTHER PUBLICATIONS

Zhu et al., "SLA Based Dynamic Virtualized Resources Provisioning for Shared Cloud Data Centers," IEEE 4th International Conference on Cloud Computing, 2011, pp. 630-637.
(Continued)

*Primary Examiner* — Padma Mundur
(74) *Attorney, Agent, or Firm* — William Hartwell; Andrew M. Calderon; Roberts Calderon Safran & Cole, P.C.

(57) ABSTRACT

Systems and methods for allocating computing resources for a multi-tiered application are disclosed. A computer-implemented method includes: determining, by a computing device, a topology of a multi-tiered application; determining, by the computing device, a modeled setting of a computing resource for the multi-tiered application based on the determined topology; determining, by the computing device, an actual usage of the computing resource by the multi-tiered application; and adjusting, by the computing device, an allocation of the computing resource to the multi-tiered application based on the actual usage and the modeled setting.

12 Claims, 8 Drawing Sheets

(51) Int. Cl.
     *G06F 9/46*          (2006.01)
     *G06F 9/50*          (2006.01)

(56) References Cited

U.S. PATENT DOCUMENTS

| | | |
|---|---|---|
| 8,839,049 B2 | 9/2014 | Hiltunen et al. |
| 8,978,030 B2 | 3/2015 | Malaiyandisamy et al. |
| 9,645,858 B2 | 5/2017 | Winterfeldt et al. |
| 2007/0192261 A1* | 8/2007 | Kelkar ..................... G06F 9/50 706/1 |
| 2010/0070784 A1* | 3/2010 | Gupta ................... G06F 1/3203 713/310 |
| 2011/0145392 A1 | 6/2011 | Dawson et al. |
| 2014/0089509 A1 | 3/2014 | Akolkar et al. |
| 2014/0137110 A1* | 5/2014 | Engle .................... G06F 9/5022 718/1 |
| 2014/0372533 A1* | 12/2014 | Fu .......................... H04L 67/10 709/204 |
| 2015/0058265 A1 | 2/2015 | Padala et al. |
| 2015/0074679 A1 | 3/2015 | Fenoglio et al. |
| 2016/0094622 A1* | 3/2016 | Thomas ................. H04L 67/10 709/203 |
| 2016/0212596 A1* | 7/2016 | Brahmi ................... H04L 67/12 |
| 2016/0294728 A1 | 10/2016 | Jain et al. |
| 2017/0149681 A1 | 5/2017 | Chen et al. |

OTHER PUBLICATIONS

Mell et al., "The NIST Definition of Cloud Computing", NIST, Special Publication 800-145, Sep. 2011, 7 pages.
"List of IBM Patents or Patent Applications Treated as Related", dated Jul. 30, 2019, 1 page.

\* cited by examiner

ASSESSMENT AND DYNAMIC PROVISIONING OF COMPUTING RESOURCES FOR MULTI-TIERED APPLICATION

BACKGROUND

The present invention relates generally to computing systems, and more particularly, to provisioning resources for a computing application.

With advent of "on-demand" and cloud computing, information technology (IT) enterprise customers are provided with more insight and control of their infrastructure so that they can add/remove resources to support their demand and reduce costs. A customer typically defines their requirements for computing resources, e.g., number of servers, type of servers, and CPU/memory/storage/network detail for each server. Alternatively, a service provider may estimate the computing resources needed by a customer by using a model/estimator and gathering user demand data from the customer to obtain a high level estimate of the needed computing resources. In either case, whether specified by the customer or estimated by the service provider, the initially allocated computing resources are typically not monitored and tuned afterwards to meet variable demands that arise later. Often a customer is restricted to a service provider's fixed capacity templates and cannot specify different computing resources and parameters to support constant changing user demands. The existing methods for adjusting resources for a customer are mostly manual, use generic static models, and incur significantly higher IT cost for customer—even for a cloud or shared instance that hosts multiple customers on a single instance, where all customer data is stored in the same database with data model and security in place to ensure data segregation.

SUMMARY

In an aspect of the invention, a computer-implemented method includes: determining, by a computing device, a topology of a multi-tiered application; determining, by the computing device, a modeled setting of a computing resource for the multi-tiered application based on the determined topology; determining, by the computing device, an actual usage of the computing resource by the multi-tiered application; and adjusting, by the computing device, an allocation of the computing resource to the multi-tiered application based on the actual usage and the modeled setting.

In another aspect of the invention, there is a computer program product for allocating computing resources for a multi-tiered application. The computer program product includes a computer readable storage medium having program instructions embodied therewith. The program instructions are executable by a computing device to cause the computing device to: determine a topology of the multi-tiered application in a networked environment; select a model based on the determined topology; determine a modeled setting of a computing resource for the multi-tiered application using the selected model; determine an actual usage of the computing resource by the multi-tiered application; and adjust an allocation of the computing resource to the multi-tiered application based on the actual usage and the modeled setting.

In another aspect of the invention, there is a system for allocating computing resources for a multi-tiered application. The system includes a CPU, a computer readable memory and a computer readable storage medium associated with a computing device. The system includes: program instructions to determine a topology of the multi-tiered application in a networked environment; program instructions to select a model based on the determined topology; program instructions to determine a modeled setting of a computing resource for the multi-tiered application using the selected model; program instructions to determine an actual usage of the computing resource by the multi-tiered application; and program instructions to adjust an allocation of the computing resource to the multi-tiered application based on the actual usage and the modeled setting. The program instructions are stored on the computer readable storage medium for execution by the CPU via the computer readable memory. The computing resource comprises one of: memory, CPU, disk, server, and network.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to computing systems, and more particularly, to provisioning resources for a computing application. Aspects of the invention are directed to a method and system for dynamically provisioning computing resources for a multi-tiered application in a cloud computing environment. In embodiments, the performance of a multi-tiered application is monitored, and resources are automatically provisioned so as to optimize performance of the application. In one aspect of the invention, a real-time model is utilized to determine the effect of user demand and load on the application. In another aspect of the invention, the real-time model is utilized to determine the effect on application performance of provisioning a computing resource. In yet another aspect of the invention, the real-time model is utilized to determine the effect on operational cost of a change to the cloud computing environment. In embodiments, an additional computing resource is provisioned according to a determination of the real-time model. In additional embodiments, an operational parameter of a currently utilized computing resource is adjusted according to a determination of the real-time model. In further embodiments, operational cost of the cloud computing environment is optimized according to a determination of the real-time model.

Aspects of the invention are directed to a system and method to enable proactive monitoring and assessment of a multi-tier application environment against real-time load and user demand within the application, and dynamically adjusting a model and auto-provisioning resources to optimize the application. In embodiments, a model component is programmed to make intelligent decisions to grow the application environment efficiently and achieve a most cost effective solution. An exemplary implementation includes a software code modification to a multi-tier application, on-demand resource provisioning solution, or cloud/software product with enhanced capacity configuration function or code embedded in hardware.

Embodiments of the invention provide for dynamically optimizing an application environment using a self-learning and self-improving model. Aspects of the invention are directed to monitoring usage at the application level rather than at the server level. In this manner, implementations of the invention are used to adjust the computing resources and specific parameters in real-time for a deployed application, rather than simply adding/removing configuration items in the infrastructure to improve performance (e.g., adding servers, logical partitions, etc.)

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
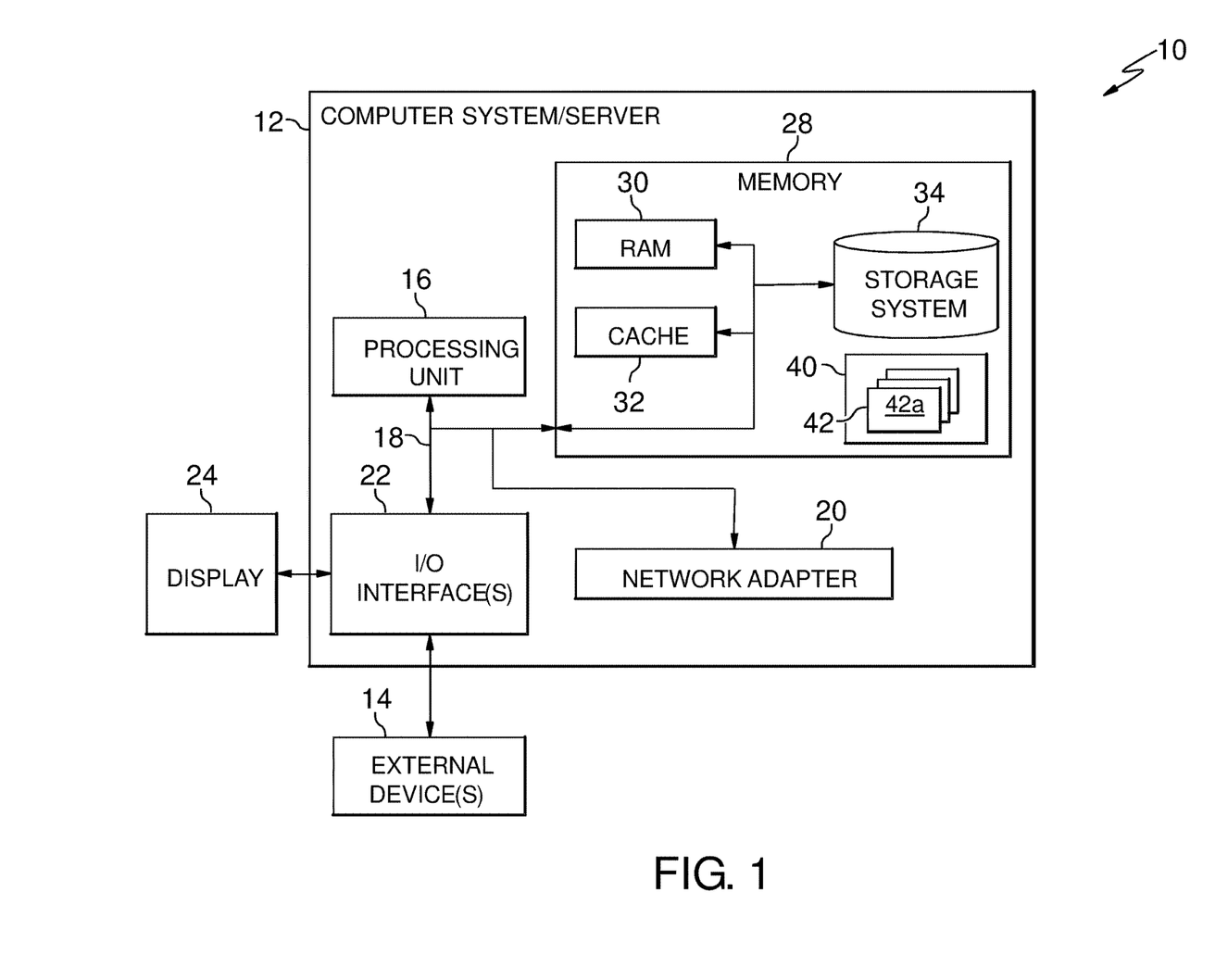
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
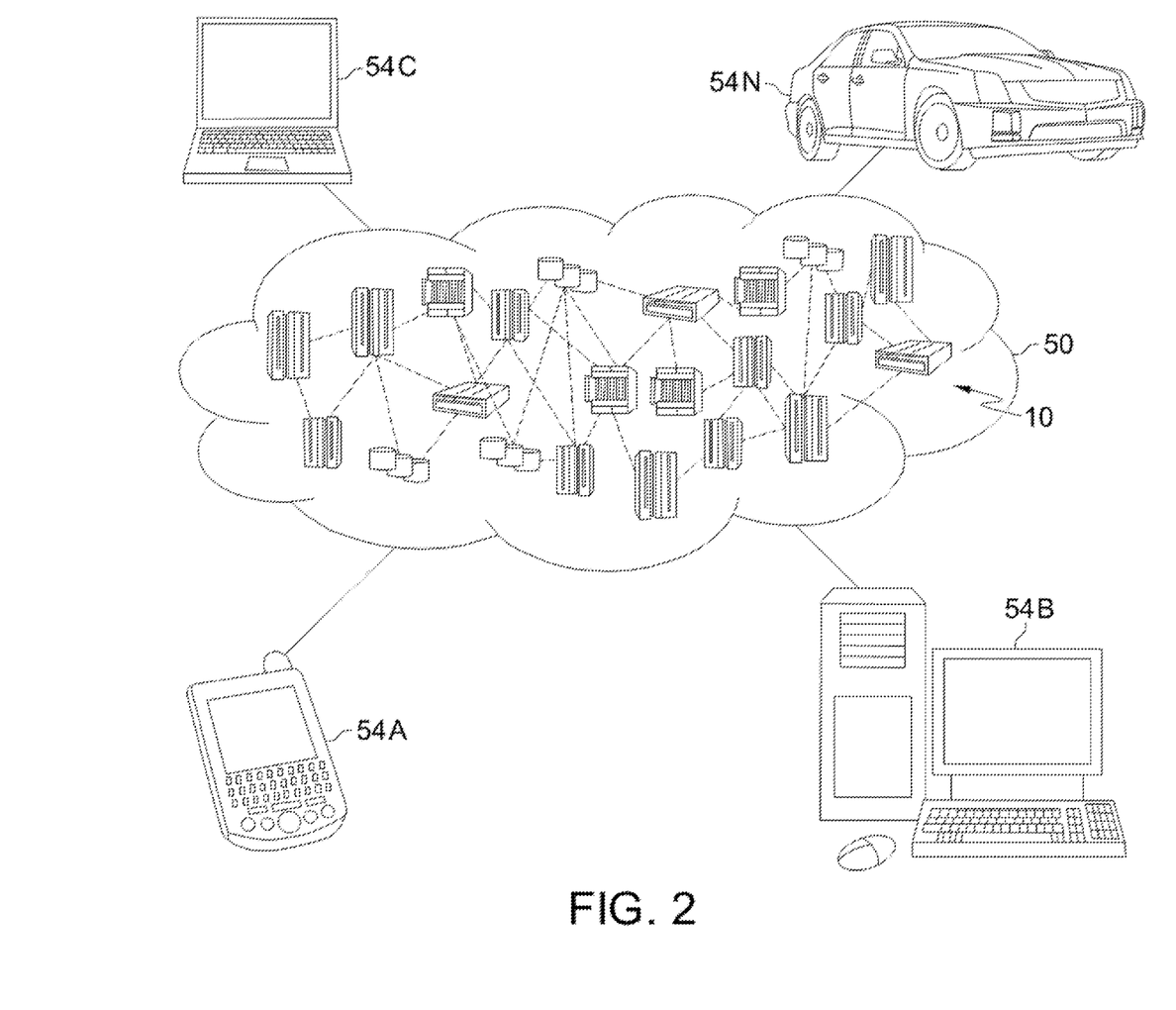
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
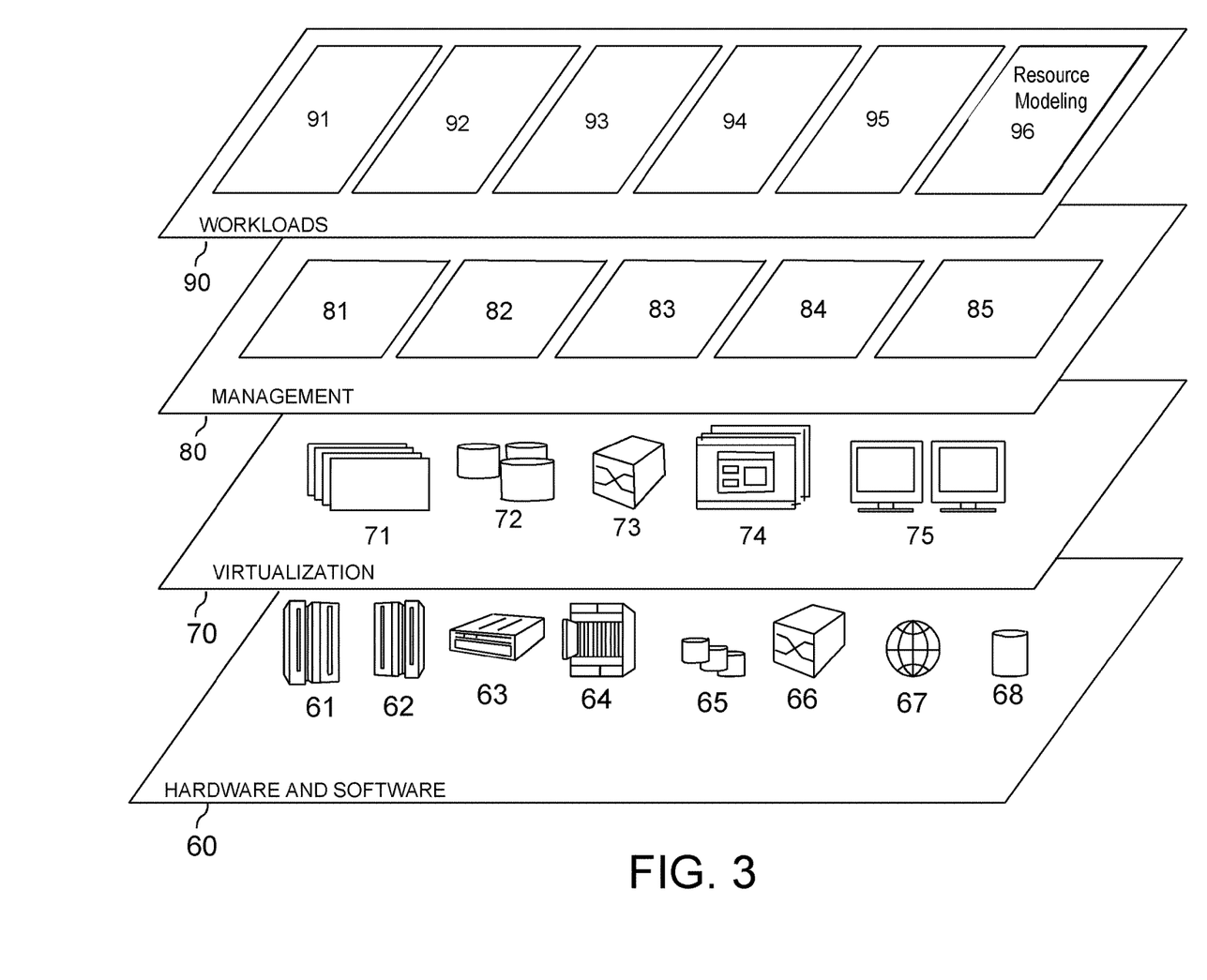
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and resource modeling 96.

Referring back to FIG. 1, the program/utility 40 may include one or more program modules 42 that carry out the functions and/or methodologies of aspects of the invention as described herein. Specifically, the program modules 42 may include a resource modeling module 42a that determines an amount of one or more computing resources utilized by a multi-tiered application in a cloud computing environment. In accordance with aspects of the invention, the resource modeling module 42a utilizes a model comprising at least one formula and parameters to determine a projected amount of a computing resource of the application. The projected amount of a computing resource determined by the model may be used to dynamically provision actual computing resources in the cloud environment for use by the application. The projected amount of a computing resource determined by the model may also be compared to historical actual usage data of the application, to adjust one or more parameters of the model for the purpose of improving the accuracy of the model.

With continued reference to the resource modeling module 42a, in embodiments a formula of the model is selected from a plurality of pre-defined formulas based on a topology of the cloud computing environment in which the multi-tiered application is deployed. The model is described herein with reference to formulas for determining an amount of memory needed by the application at respective cloud computing environment nodes based on topology. However, the invention is not limited to modeling memory, and implementations of the invention may be used to model other types of computing resources, including without limitation: memory, CPU, disk, server, and network.

Figure 4:
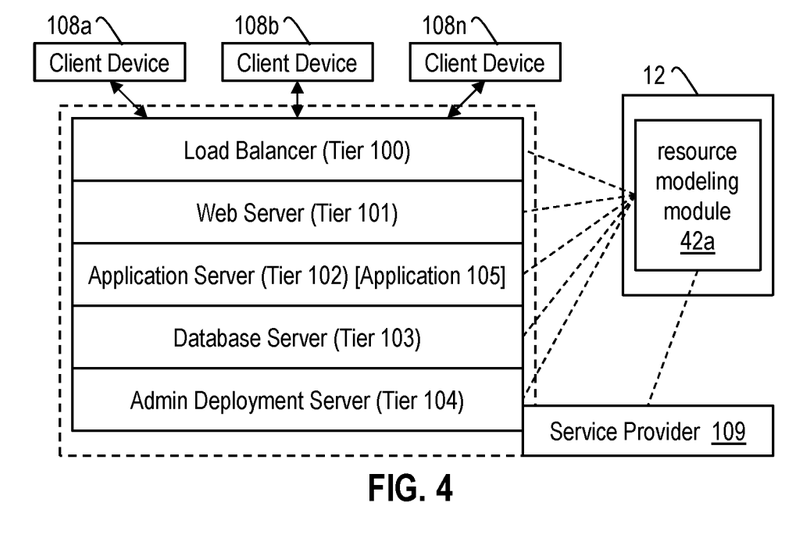
FIG. 4 shows a computing environment in accordance with aspects of the invention.

FIG. 4 shows a computing environment in accordance with aspects of the invention. Specifically, FIG. 4 shows a block diagram of an architecture for deploying and operating a multi-tiered application in a cloud computing environment. In embodiments, the architecture includes a load balancer tier 100 (Tier 0), a web server tier 101, an application server tier 102, a database server tier 103, and an admin deployment server tier 104.

In embodiments, the load balancer tier 100 comprises edge components (e.g., edge servers) that distribute user traffic evenly to the web server tier 101 while providing redundancy in the event one or more web servers are unavailable. Redundancies and cascading balancers may be incorporated in the load balancer tier 100.

In embodiments, the web server tier 101 includes web servers that are the front-end User Interface (UI). The web servers also act as the front-end for all web services enabled integration. The web service itself may be provided by an HTTP server, which may be setup with Secure Socket Layer (SSL).

In embodiments, the application server tier 102 includes application servers that are the middle-layer that process the transactions from the web servers and interact with the database servers. The transaction processing itself is provided by a composite application manager for any multi-tiered application. The application servers may be load-balanced for redundancy.

In embodiments, the database server tier 103 includes database servers that are the back-end database engine for all the transactions. Different types of databases may be managed by a database manager at the database server tier 103. For example, the database manager may manage a primary database that is the production database for the online transactions and that resides on its own server for optimal performance. The database manager may also manage a backup/reporting database that is a near-sync replica of the production database that can be used for failover purposes. The replication may be achieved using a high availability disaster recovery (HADR) facility. This backup/reporting database may also be used to support reporting activities. The database manager may also manage a reporting database that is a near-sync replica of the production database that is used for reporting. The native multi-tiered application queries and reporting tools utilize the reporting database, which resides on a secondary database server.

In embodiments, the admin deployment server tier 104 includes an admin deployment server that is used to manage configuration updates for the multi-tiered application. The multi-tiered application may be Java based, in which case new configuration updates are compiled and distributed as Enterprise Archive (EAR) files. This admin deployment server may be used to manage application deployments to the application servers at the application server tier 102.

The tiers 100-104 may comprise computing devices (e.g., edge components, servers, databases, etc.) that are located at same or different nodes of a cloud computing environment (e.g., nodes 10 of cloud computing environment 50 as described with respect to FIG. 2). Particular ones of the computing devices of the tiers 100-104 may communicate with each other via network communication in the cloud computing environment as described herein. For example, in accordance with aspects of the invention, a customer's application 105 (e.g., an enterprise application) runs on at least one application server at the application server tier 102 and communicates with at least one web server at the web server tier 101 and at least one database server at the database server tier 103. Users may access the application 105 using client computer devices 108a, 108b, . . . , 108n that communicate with the edge components of tier 100 via a network (e.g., LAN, WAN, Internet, etc.). As described herein, the application 105 is a multi-tier application because it utilizes computing resources at plural tiers of the environment.

In embodiments, the resource modeling module 42a running on the computer system 12 communicates with components at one or more of the tiers 100-104 to obtain data for modeling the application 105. A service provider may at least one of deploy, support, control, and maintain the computing resources at each of the tiers 100-104, such that the customer utilizes the service provider's computing resources for running the application 105. In embodiments, the resource modeling module 42a may communicate with a service provider computing device 109 to request that the service provider provision additional computing resources at one or more of the tiers 100-104 to support increased demand for the application 105. The resource modeling module 42a may request provisioning of the additional computing resources for the application 105 based on a determination made using a model as described herein. The service provider computing device 109 and the computer system 12 running the resource modeling module 42a may each be a node in the cloud environment.

Figure 5A:
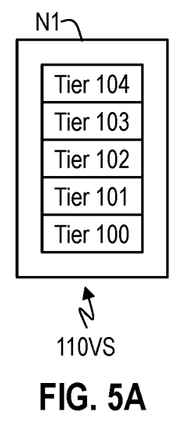
FIGS. 5A-D show topologies for deploying a multi-tiered application in accordance with aspects of the invention.
Figure 5B:
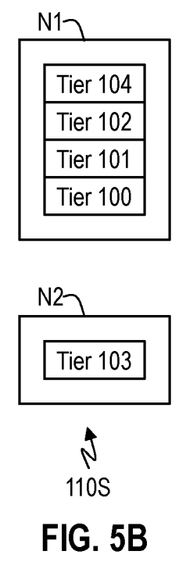
Figure 5C:
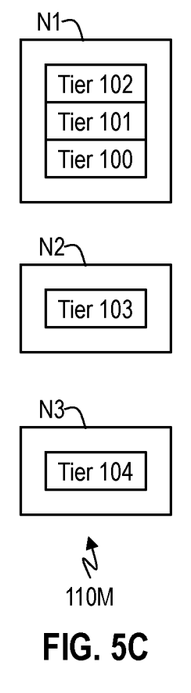
Figure 5D:
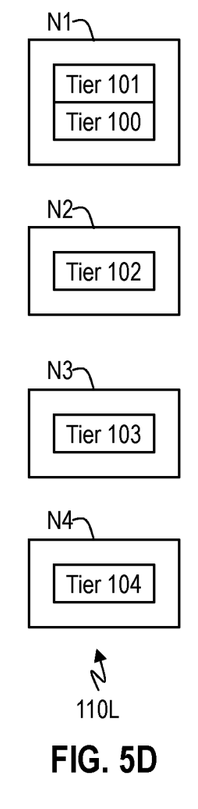

The tiers 100-104 may be arranged at the nodes to form different cloud computing environment topologies. For example, FIG. 5A shows a very small topology 110VS in which tiers 100-104 are located at a same node N1. FIG. 5B shows a small topology 110S in which tiers 100, 101, 102, and 104 are at a first node N1, and tier 103 is at a second node N2. FIG. 5C shows a medium topology 110M in which tiers 100, 101, 102 are at a first node N1, tier 103 is at a second node N2, and tier 104 is at a third node N3. FIG. 5D shows a large topology 110L in which the tiers 100, 101 are at a first node N1, tier 102 is at a second node N2, tier 103 is at a third node N3, and tier 104 is at a fourth node N4.

According to aspects of the invention, the resource modeling module 42a utilizes different models for modeling resources of the application 105 based on the type of environment topology. In one example, for an application that is deployed in a very small topology 110VS, the resource modeling module 42a may utilize a model illustrated by Equation 1 to determine an amount of memory M1 needed by the application at node N1.

$$M1=((I1*P1)+P2)+((I1/I2)*P3+(P4*2)+P5)+ \\ ((I1*P6)+(I3*P7))+P8 \quad (1)$$

where:
M1: memory in Gigabytes at node N1 (tiers 100-104);
P1: LBMemPerUser;
P2: LBBaseMem;
P3: UIClusterJvmMEM;
P4: PerfMonJvmMEM;
P5: ACDMgrMem;
P6: DBMemoryPerUser;
P7: DBMSBufferPoolRatio;
P8: BaseOSMem;
I1: ConcurrentAppUsers;
I2: MaxUserJVM; and
I3: DBSize.

In Equation 1, the parameters P1-P8 are numeric values that correspond to performance parameters of the system, as described in greater detail herein. The numeric value of at least one of the parameters may be adjusted based on observed actual usage of the application in order to tune the model such that the output of the model more accurately predicts the actual usage of the application. In Equation 1, the inputs I1-I3 are numeric values that correspond to real time usage of the application, as described in greater detail herein.

In another example, for an application that is deployed in a small topology 110S, the resource modeling module 42a may utilize a model illustrated by Equations 2 and 3 to determine an amount of memory M1, M2 needed by the application at nodes N1 and N2, respectively.

$$M1=((I1*P1)+P2)+((I1/I2)*P3+(P4*2)+P5)+P8 \quad (2)$$

$$M2=((I1*P6)+(I3*P7))+P8 \quad (3)$$

where:
M1: memory in Gigabytes at node N1 (tiers 100, 101, 102, 104); and
M2: memory in Gigabytes at node N2 (tier 103).

In another example, for an application that is deployed in a medium topology 110M, the resource modeling module 42a may utilize a model illustrated by Equations 4, 5, 6 to determine an amount of memory M1, M2, M3 needed by the application at nodes N1, N2, N3, respectively.

$$M1=((I1*P1)+P2)+((I1/I2)*P3+(P4*2))+P8 \quad (4)$$

$$M2=((I1*P6)+(I3*P7))+P8 \quad (5)$$

$$M3=P5+P8 \quad (6)$$

where:
M1: memory in Gigabytes at node N1 (tiers 100, 101, 102);
M2: memory in Gigabytes at node N2 (tier 103); and
M3: memory in Gigabytes at node N3 (tier 104).

In another example, for an application that is deployed in a large topology 110L, the resource modeling module 42a may utilize a model illustrated by Equations 7, 8, 9, 10 to determine an amount of memory M1, M2, M3, M4 needed by the application at nodes N1, N2, N3, N4 respectively.

$$M1=((I1*P1)+P2)+P8 \quad (7)$$

$$M2=((I1/I2)*P3+(P4*2))+P8 \quad (8)$$

$$M3=((I1*P6)+(I3*P7))+P8 \quad (9)$$

$$M4=P5+P8 \quad (10)$$

where:
M1: memory in Gigabytes at node N1 (tiers 100, 101);
M2: memory in Gigabytes at node N2 (tier 102);
M3: memory in Gigabytes at node N3 (tier 103); and
M4: memory in Gigabytes at node N4 (tier 104).

The equations (e.g., Equations 1-10) are exemplary and non-limiting, and other equations may be used in implementations of the invention. Further, the parameters P1-P8 are exemplary and non-limiting, and other parameters may be used in implementations of the invention. Still further, the inputs I1-I3 are exemplary and non-limiting, and other inputs may be used in implementations of the invention.

In embodiments, the parameters P1-P8 are predefined with initial numerical values. For example, parameter P1 (LBMemPerUser) may be initially set at 0.0003333 GB and corresponds to an amount of memory per user within tier 100, i.e., load balancer run-time memory consumption per concurrent user that resides on a load balancer server. Parameter P2 (LBBaseMem) may be initially set at 1 GB and corresponds to base SW memory used within tier 100, i.e., a load balancer run-time base memory that resides on a load balancer server. Parameter P3 (UIClusterJvmMEM) may be initially set at 4 GB and corresponds to memory per JVM within tier 102, i.e., a UI JVM run-time base memory that resides on an application server. Parameter P4 (PerfMonJvmMEM) may be initially set to 2 GB and corresponds to memory used within tier 102, i.e., Performance Monitor JVM run-time base memory that resides on an application server. Parameter P5 (ACDMgrMem) may be initially set to 0.5 GB and corresponds to memory used within tier 104, i.e., admin and deployment manager run-time base memory that resides on an optional admin server. Parameter P6 (DBMemoryPerUser) may be initially set at 0.00065 GB and corresponds to memory per user within tier 103, i.e., database run-time memory consumption per concurrent user that resides on a database server. Parameter P7 (DBMS- BufferPoolRatio) may be initially set at 10% and corresponds to memory used within tier 103, i.e., database buffer pool run-time base memory that resides on an application server. Parameter P8 (BaseOSMem) may be initially set at 8 GB and corresponds to base OS memory used within all tiers, i.e., OS run-time base memory that resides on a load balancer server, an application server, a database server, and an admin server.

In embodiments, the inputs I1-I3 correspond to real time application usage data. For example: I1 (ConcurrentAppUsers) corresponds to the number of users that are currently using the application; I2 (MaxUserJVM) corresponds to the maximum number of users of the application; and I3 (DBSize) corresponds to the database size of the application. Values for the inputs I1-I3 are available from one or more of the tiers and may be gathered by the resource modeling module 42a in real time during running of the application.

Figure 6A:
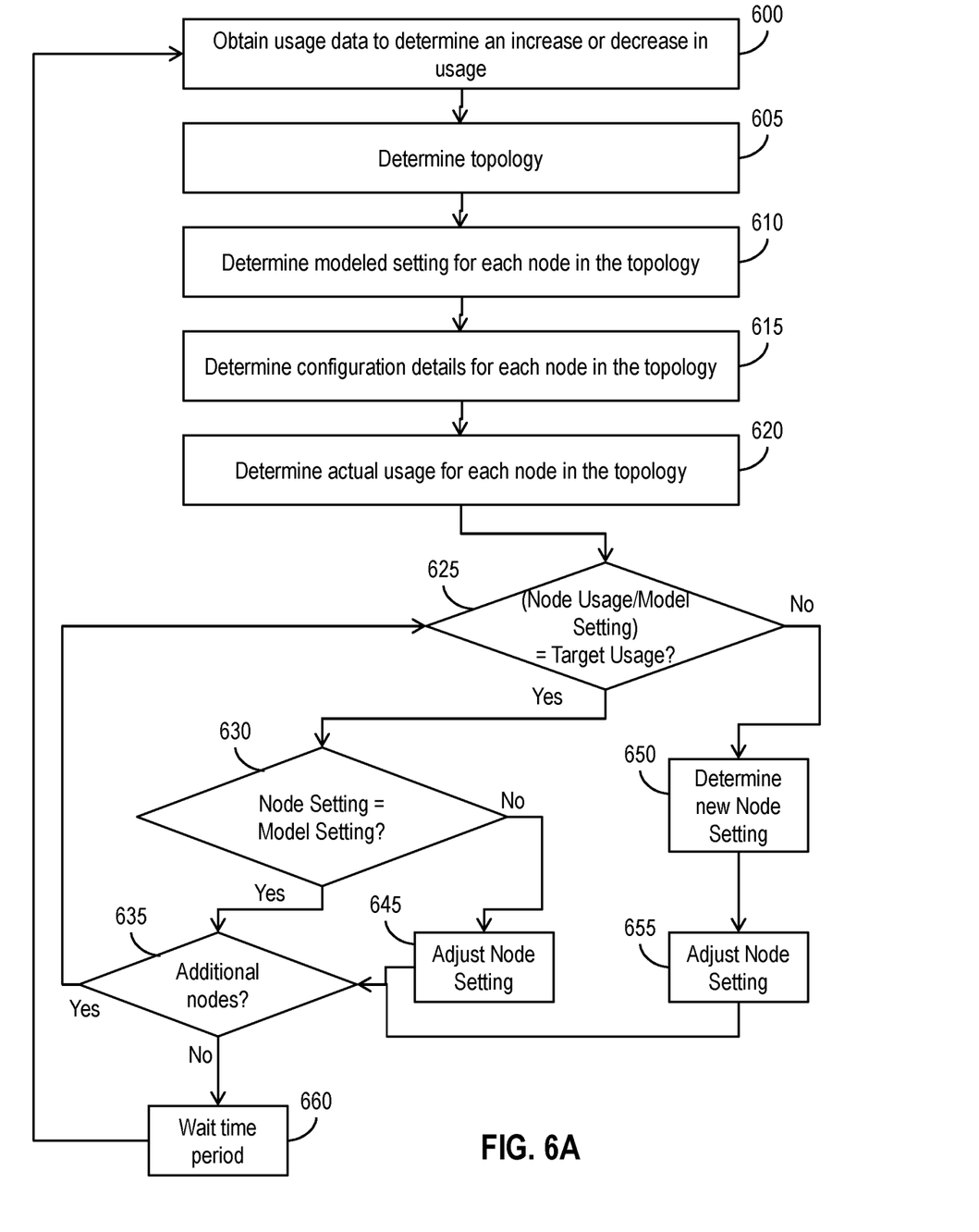
FIGS. 6A and 6B show flowcharts of methods in accordance with aspects of the invention.

FIG. 6A shows a flowchart of a method in accordance with aspects of the invention. In embodiments, the amount of memory provisioned for a node of an application (e.g., application 105) is adjusted in real time based on: an amount of the resource (e.g., memory) determined by the model ("Model Setting"); an amount of the resource (e.g., memory) currently provisioned to the node ("Node Setting"); an amount of the resource (e.g., memory) currently used by the node ("Node Usage"); and a target usage ratio ("Target Usage"). Steps of the method of FIG. 6A may be performed by the resource modeling module 42a in association with the multi-tiered application 105 in the environment illustrated in FIG. 4.

At step 600, the system (e.g., the computer system 12 running the resource modeling module 42a) obtains user concurrent usage data from the application (e.g., application 105) and determines whether usage has increased or decreased. The user concurrent usage data may include data defining a number of users currently using the application, which number may be assigned to I1 (ConcurrentAppUsers). The system may determine whether usage has increased or decreased by comparing the currently determined user concurrent usage data to previously determined user concurrent usage data.

At step 605, the system obtains information defining the topology of the application. The topology information may include data defining locations (e.g., nodes) of computer devices (e.g., edge servers, web servers, application servers, database servers, etc.) used by the application, and is available by polling the computer devices in the tiers and/or the service provider computer device. In embodiments, the system uses the topology information to determine whether the application is deployed in a very small topology (e.g., 110VS), a small topology (e.g., 110S), a medium topology (e.g., 110M), or a large topology (e.g., 110L).

At step 610, the system determines a modeled setting (e.g., an optimum resource setting) for each node of the application as defined by the topology determined at step 605. For example, when it is determined at step 605 that the application is deployed in a very small topology (e.g., 110VS), then at step 610 the resource modeling module may use Equation 1 to determine an optimum resource setting ("Model Setting") for the single node (N1) of the application. When it is determined at step 605 that the application is deployed in a small topology (e.g., 110S), then at step 610 the resource modeling module may use Equations 2, 3 to determine a respective optimum resource setting for each of nodes N1, N2 of the application. When it is determined at step 605 that the application is deployed in a medium topology (e.g., 110M), then at step 610 the resource modeling module may use Equations 4, 5, 6 to determine a respective optimum resource setting for each of nodes N1, N2, N3 of the application. When it is determined at step 605 that the application is deployed in a large topology (e.g., 110L), then at step 610 the resource modeling module may use Equations 7, 8, 9, 10 to determine a respective optimum resource setting for each of nodes N1, N2, N3, N4 of the application. In using any of Equations 1-10 at step 610, the system may obtain the predefined values of parameters P1-P8 from memory (e.g., memory 28) and the real time values of inputs I1-I3 from one or more of the devices in the tiers 100-104.

At step 615, the system determines configuration details for each node of the application as defined by the topology determined at step 605. In embodiments, the configuration details include data defining the amount of resource currently provisioned to the node (e.g., "Node Setting") and the target usage ratio ("Target Usage") of the node. When there are plural nodes, the system determines respective values for "Node Setting" and "Target Usage" for each respective node. The amount of resource currently provisioned to the node (e.g., "Node Setting") is available, for example, by polling the computer devices in the tiers and/or the service provider computer device. The target usage ratio ("Target Usage") is a predefined value that may be adjusted (e.g., by an owner of the application) based on risk tolerance, and is available from memory (e.g., memory 28).

At step 620, the system determines actual resource usage for each node of the application as defined by the topology determined at step 605. The amount of resource currently being used by a node (e.g., "Node Usage") is available, for example, by polling the computer devices in the tiers and/or the service provider computer device.

At step 625, for a particular node, the system compares a ratio of "Node Usage" to "Model Setting" to the value of "Target Usage" using the values of "Node Usage", "Model Setting", and "Target Usage" that were previously determined for this particular node at steps 615 and 620. When it is determined at step 625 that the ratio of "Node Usage" to "Model Setting" equals the value of "Target Usage", then at step 630 the system compares the value of "Node Setting" (from step 615) to the value of "Model Setting" (from step 610) for the particular node.

When it is determined at step 630 that the value of "Node Setting" equals the value of "Model Setting", this indicates that the model recommends the same amount of resource that is currently provisioned to the node and that utilization is at the target ratio (from step 625). In this case, no action is taken to adjust the amount of resource provisioned to the node, and the process proceeds to step 635, which is described in greater detail herein.

Referring back to step 630, when it is determined that the value of "Node Setting" does not equal the value of "Model Setting", this indicates that the model recommends a different amount of resource than is currently provisioned to the node and that utilization is at the target ratio (from step 625). In this case, at step 645 the system provisions additional resource for the node using an application program interface (API) call to the service provider computer device. In embodiments, the amount of additional resource provisioned at step 645 equals the difference between "Model Setting" and "Node Setting" such that after the provisioning the amount of resource allocated to the node (e.g., "New Node Setting") equals "Model Setting".

Referring back to step 625, when it is determined that the ratio of "Node Usage" to "Model Setting" does not equal the value of "Target Usage", this indicates that utilization of the node is not equal to the target utilization. In this situation, at step 650 a new value for the resource provisioned at the node ("New Node Setting") is determined by dividing "Node Usage" by "Target Usage". At step 655, the system uses an API service call to the service provider computer device to adjust the amount of resource that is provisioned to the node, wherein the adjustment is based on the "New Node Setting" value determined at step 650. The value determined at step 650 and the adjustment requested at step 655 may increase or decrease the amount of resource that is provisioned to the node, depending on whether the actual usage is above or below the target utilization.

At step 635, the system determines whether there are any additional nodes associated with the application. When there are additional nodes, the process returns to step 625 to analyze the next node. When there are no remaining nodes to analyze for this particular application, the system proceeds to step 660 where a predefined amount of time is waited. After the wait at step 660, the system starts the process anew by returning to step 600.

Figure 6B:
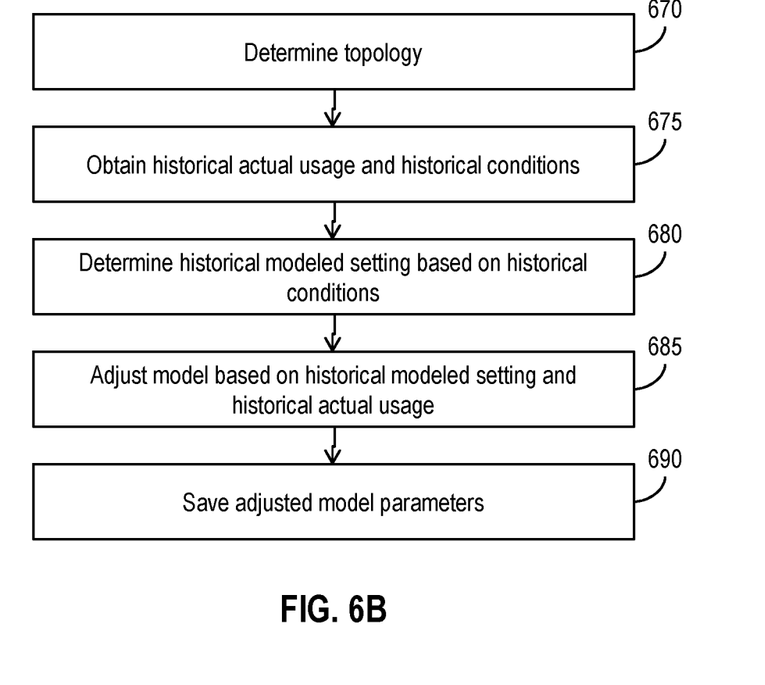

FIG. 6B shows a flowchart of a method in accordance with aspects of the invention. In embodiments, the model used to determine the optimum resource setting for each node of the application (e.g., application 105) is adjusted based on comparing output of the model to actual resource usage of the application. Steps of the method of FIG. 6B may be performed by the resource modeling module 42a in association with the multi-tiered application 105 in the environment illustrated in FIG. 4.

At step 670, the system (e.g., the computer system 12 running the resource modeling module 42a) determines the topology of the application (e.g., application 105). Step 670 may be the same as step 605 in which the system determines nodes associated with the computing devices used by the application, and in which the system determines whether the application is deployed in a very small topology (e.g., 110VS), a small topology (e.g., 110S), a medium topology (e.g., 110M), or a large topology (e.g., 110L).

At step 675, the system obtains data defining historical actual usage of the application. For example, the system may obtain data indicating actual resource usage ("Node Usage") by the application at a previous date and time, and the historical conditions (e.g., inputs I1-I3) at he same previous date and time that resulted in the historical actual usage. The system may perform step 675 for each node of the application. The historical actual usage data is available by polling the computer devices in the tiers and/or the service provider computer device.

At step 680, the system determines a historical modeled setting for the resource at each node based on the historical usage data. In embodiments, the system uses the historical conditions (e.g., inputs I1-I3) that were determined at step 675 and the parameters P1-P8 with at least one of Equations 1-10 to determine "Model Setting" for each node based on the historical usage data.

At step 685, the system adjusts the model based on the historical actual usage from step 675 and the determined historical modeled setting from step 680. In embodiments, the system uses parameter optimization techniques to adjust the value of at least one of the parameters P1-P8 to make the modeled setting (e.g., "Model Setting") more accurately match the actual usage ("Node Usage"). Step 685 may include, for example, an iterative parameter optimization process in which the system adjusts values of at least one of the parameters, determines new modeled setting using the adjusted parameters, compares the new modeled setting to the actual memory usage, and then again adjusts values of at least one of the parameters based on the comparing the new modeled setting to the actual memory usage. The system may perform the parameter optimization on a node-by-node basis, or may perform the parameter optimization on all nodes at a same time. Conventional parameter optimization techniques may be used.

At step 690, the system saves the new values of parameters P1-P8 for use in the model in subsequent determinations (e.g., for determining "Model Setting" at step 610). The values of parameters P1-P8 may be saved in memory (e.g., memory 28).

The flowcharts depicted in FIGS. 6A and 6B provide a method for proactively monitoring and assessing an application environment using a predefined model for generating a required computing resource (e.g., memory). The method may include performing data collection from a deployed application and determining if usage has increased or decreased, determining an improvement exists for the existing model, and using the model to determine the optimum computing resource settings based on user demand data including concurrent usage, existing topology, and configuration detail from existing nodes. The method may also include performing data collection on actual computing resource (e.g., memory) usage and comparing the actual usage against historical data and projected demands, determining an improvement exists for the existing model or node, and invoking available APIs to dynamically adjust the computing resource (e.g., memory) to the optimum settings. The method may also include automatically creating a new version of the model with new values of parameters, and archiving the old version of the model for version control. The method may include repeating the steps based on scheduled cycle or defined triggering criteria. The method may further include updating the computing resource (e.g., memory) and model in real-time or based on a predefined change/outage window. The method may additionally include detecting a change/outage time in the environment and recommending an update time to a user. The method may also include automatically implementing the updating or obtain approval for scheduled implementation of the updating. The method may further include alerting the model author for an update and obtaining approval for implementation of the update.

Figure 7:
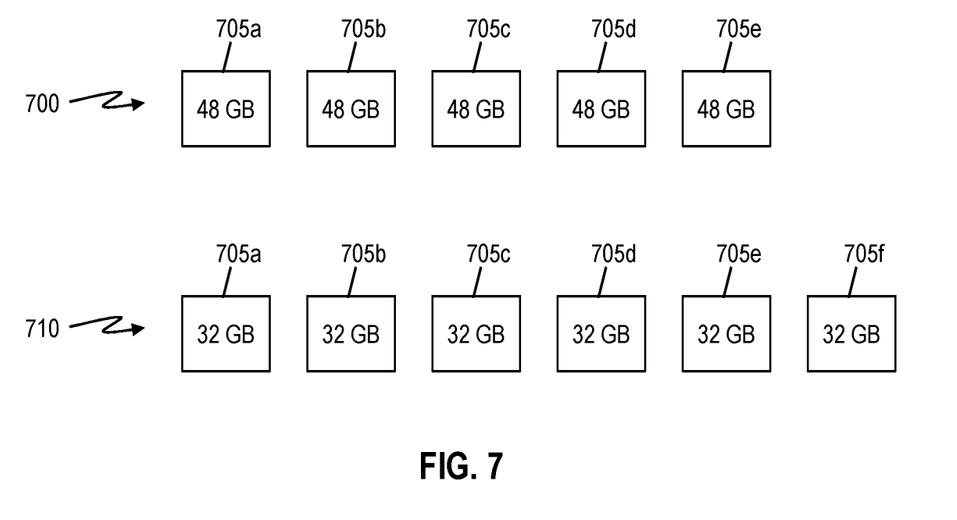
FIG. 7 shows a block diagram that illustrates determining an optimum cost configuration based on dynamically updating an allocation of a computing resource.

FIG. 7 shows a block diagram that illustrates determining an optimum cost configuration based on dynamically updating an allocation of a computing resource. Typical cloud systems allow for automatic scaling horizontally, but do not take into account that adding an additional server may allow for decrease in the required computing resources on the existing servers, such as memory or CPU. For example, FIG. 7 shows a first configuration 700 in which an application (e.g., application 105 of FIG. 4) is deployed on five servers 705a-e, where each server 705a-e has a first amount of memory (e.g., 48 GB). This deployment in the first configuration 700 is sufficient to handle a first number of tickets (e.g., 100,000 tickets) associated with the application. In the event the owner of the application wishes to increase capacity to a second number of tickets (e.g., 120,000 tickets), analytics may be used to determine that the first configuration has insufficient memory to handle the second number of tickets. A conventional methodology might simply add a sixth server that has the first amount of memory (48 GB in this example) as the five servers 705a-e; however, this approach may add more memory than is actually needed for the second number of tickets and, thus, add unnecessary cost to the owner of the application (e.g., six 48 GB servers at $295 each equals $1770).

Implementations of the invention, on the other hand, may utilize the aforementioned model to determine an optimum amount of memory for each server based on the anticipated demand (e.g., 120,000 tickets in this example), and adjust the memory allocated to each server based on determined optimum amounts. For example, the system in accordance with aspects of the invention may recommend a second configuration 710 for handling the second number of tickets (e.g., 120,000 tickets), wherein a sixth server 705f is added and each of the first five servers 705a-e is adjusted to have a second amount of memory (e.g., 32 GB) that is different than the first amount of memory (e.g., 48 GB). In this manner, aspects of the invention may be used to determining an optimum cost configuration (e.g., six 32 GB servers at $226 each for a cost of $1356). Therefore, instead of just adding a server using a standard template, this invention's model would recommend (a) adding a new server with the adjusted configuration, and (b) adjust the memory on the existing five servers. In this example, the dynamic modeling and cost/demand/resource analysis provided by aspects of the invention results in savings of $414 per month ($1770–$1356) for the customer. The saving can be much greater depending on the multi-tier application deployment type and additional hardware/computer resource requested. In this manner, implementations of the invention may be used to optimize a cost of provisioned resources in the environment using the model.

Aspects of the invention thus include a method for calculating a most cost-effective option for dynamically updating a computing resource of a multi-tiered application. The method includes: performing a cost analysis based on actual usage and requested computing resource (e.g., memory) in order to support the deployed application; obtaining cost information from one or more trusted sources and analyzing the cost information per computing resource and granular parameters; obtaining model information to determine the tunable computer resource and parameters; automatically determining a priority or obtaining a predefined priority; determining a largest cost factor, computing resource, demand parameter (e.g., ticket volume), concurrent user number, and performance (e.g., specific action time); calculating a potential cost saving by running variations of the analysis based on priority for supported demand; ensuring demand and performance meets the requirement based on existing configuration and additional hardware and scaling request; presenting a recommended saving option, and applying the selected option; monitoring via a feedback loop to periodically check for additional cost improvement; obtaining new cost data and comparing against existing cost numbers and analyzing the result.

Figure 8A:
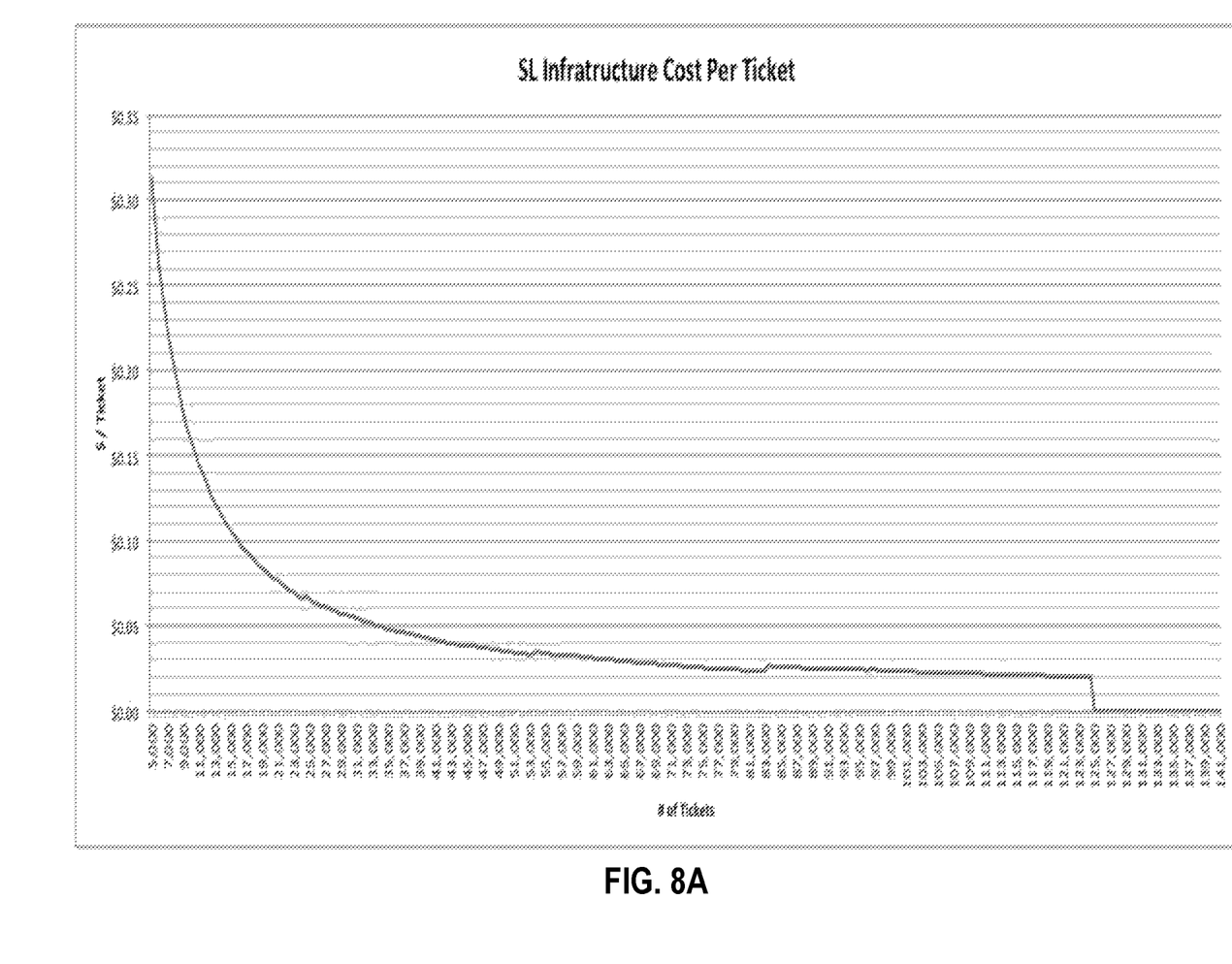
FIGS. 8A and 8B show plots of exemplary costs per parameter in accordance with aspects of the invention.
Figure 8B:
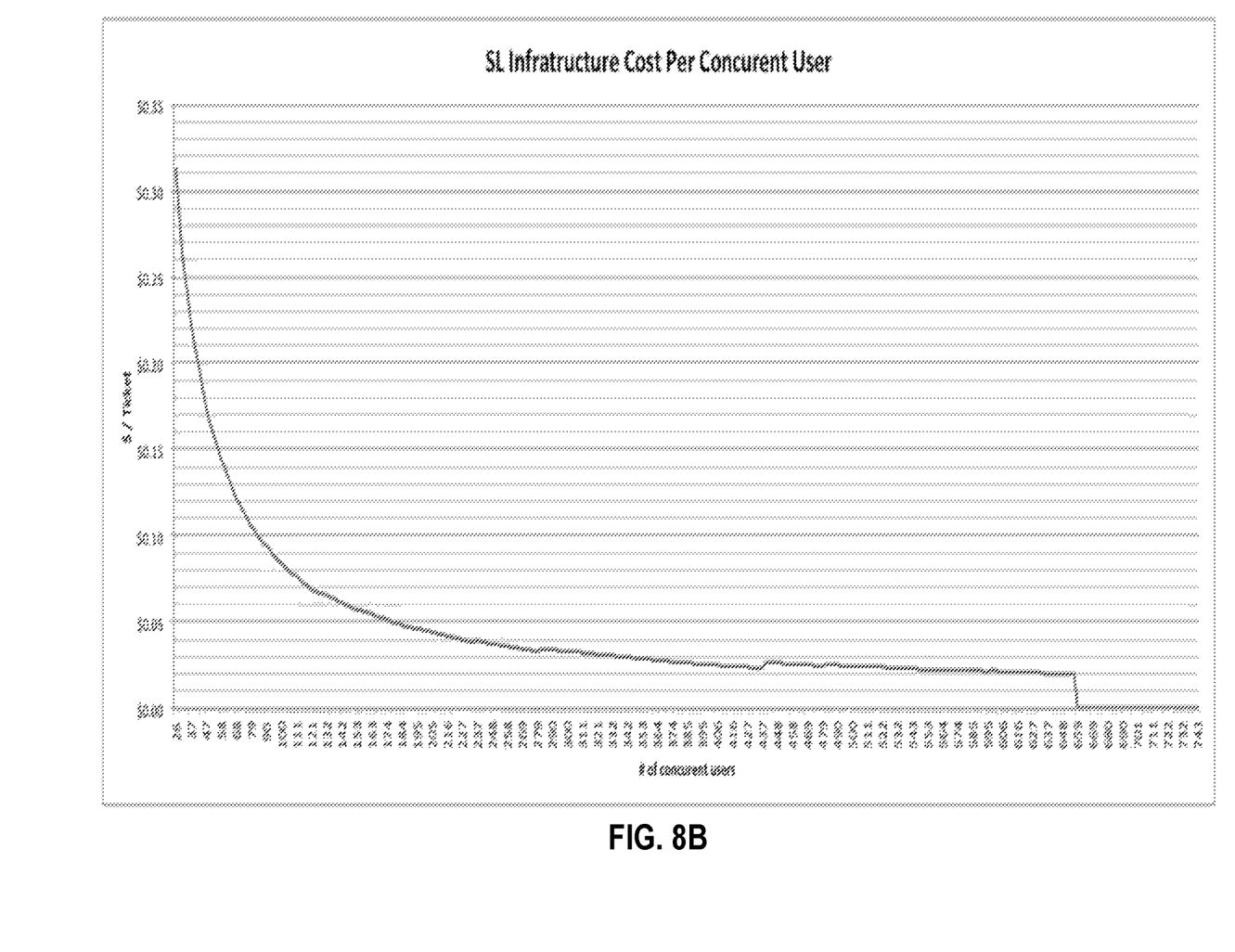

FIGS. 8A and 8B show plots of exemplary costs per parameter in accordance with aspects of the invention. In embodiments, the model described herein may be used to model costs per parameter, such as soft layer (SL) infrastructure cost per ticket (FIG. 8A) and SL infrastructure cost per concurrent user (FIG. 8B). For example, the model described herein may be used to determine a respective optimum amount of memory for plural different numbers of tickets, and a respective cost per number of tickets may be determined based on each respective optimum amount of memory. The resulting costs per number of tickets may be plotted to assist an application owner in making a decision how best to deploy the application. In this manner, implementations of the invention may use the model to determine a respective cost per unit for plural different numbers of units (e.g., cost per ticket for plural different numbers or tickets, cost per concurrent user for plural different numbers of concurrent users). In this manner, aspects of the invention advantageously provide the ability to achieve balance of optimal application and efficient computing resource through dynamic model update and provisioning. The model may be run in real-time with learning, maturing, and self-optimizing for the deployed application instance. Implementations of the invention may have a built in contingency to avoid disaster, and reduce the initial contingency as the model becomes more efficient and accurate. A cost analysis aspect as described herein may be used to achieve significant IT cost saving for customers.

In still additional embodiments, the invention provides a computer-implemented method for multi-tier application modeling and resource provisioning via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   determining, by a computing device, a topology and a size of the topology of a multi-tiered application;
   determining, by the computing device, a modeled setting for nodes of the multi-tiered application based on the size of the topology of the multi-tiered application to determine an amount of memory needed by the multi-tiered application at the nodes;
   adjusting, by the computing device, an allocation of the memory to the multi-tiered application based on an actual usage of the memory by the multi-tiered application and the modeled setting; and
   proactively monitoring and assessing, by the computing device, the multi-tiered application against a real-time load and a demand within the multi-tiered application using the modeled setting by performing data collection on the actual memory usage and comparing the actual memory usage against historical data and projected demands.

2. The method of claim 1, further comprising:
   determining a schedule from a change management system; and
   obtaining approval to perform the adjusting based on the determined schedule.

3. The method of claim 1, wherein the adjusting comprises dynamically increasing or decreasing the allocation of the memory for use by the multi-tiered application.

4. The method of claim 1, wherein the modeled setting comprises a plurality of parameters which are adjusted to tune the modeled setting to predict the actual usage of the memory by the multi-tiered application.

5. The method of claim 4, wherein the modeled setting is an optimum resource setting of each node of the nodes of the multi-tiered application according to the size of the determined topology, and the plurality of parameters of the modeled setting are adjusted in view of the size of the determined topology.

6. The method of claim 1, further comprising selecting a model based on the determined topology, wherein the determining the modeled setting is performed using the selected model.

7. The method of claim 6, wherein the selected model comprises at least one equation and a plurality of parameters with respective priorities.

8. The method of claim 7, further comprising:
obtaining historical usage data of the memory by the multi-tiered application;
obtaining historical condition data associated with the historical usage data; and
using the selected model to determine a historical modeled setting based on the historical condition data.

9. The method of claim 8, further comprising adjusting a value of at least one of the parameters of the selected model based on the historical usage data and the historical modeled setting.

10. The method of claim 1, wherein:
the multi-tiered application is deployed in a networked environment; and
the determining the topology comprises determining the nodes of the multi-tiered application in the networked environment.

11. The method of claim 1, wherein the determining the modeled setting of the computing resource comprises determining a respective modeled setting of each nodes of the nodes.

12. The method of claim 11, wherein the nodes each have an associated target usage.

* * * * *